United States Patent [19]

McGuire et al.

[11] Patent Number: 4,871,032

[45] Date of Patent: Oct. 3, 1989

[54] DEEP TILLAGE IMPLEMENT

[75] Inventors: William G. McGuire, Mt. Macedon; Hartley F. Young, Melton, both of Australia

[73] Assignee: Ralph McKay Limited, Maidstone, Australia

[21] Appl. No.: 187,583

[22] Filed: Apr. 28, 1988

Related U.S. Application Data

[63] Continuation-in-part of Ser. No. 36,707, Apr. 10, 1987, abandoned.

[51] Int. Cl.⁴ .............................................. A01B 23/02
[52] U.S. Cl. ..................................... 172/749; 172/762
[58] Field of Search ............... 172/751, 762, 753, 724, 172/730, 763, 749, 722

[56] References Cited

U.S. PATENT DOCUMENTS

| 1,605,861 | 11/1926 | Snyder | 172/762 |
| 3,061,021 | 10/1962 | Shader | 172/762 X |
| 4,190,115 | 2/1980 | Couture | 172/753 |
| 4,333,536 | 6/1982 | Ryan | 172/762 X |
| 4,638,868 | 1/1987 | Johnson | 172/762 |

FOREIGN PATENT DOCUMENTS

| 106027 | 11/1938 | Australia | 172/762 |
| 0031248 | 7/1981 | European Pat. Off. | 172/749 |

Primary Examiner—Richard J. Johnson
Attorney, Agent, or Firm—Christel, Bean & Linihan

[57] ABSTRACT

A deep tillage earth engaging implement having a frictional attachment to a tine of an agricultural machine in which the attachment portion incorporates a socket with a cross-section tapering toward the earth engaging portion. The foot of the tine is of complementary shape.

4 Claims, 3 Drawing Sheets

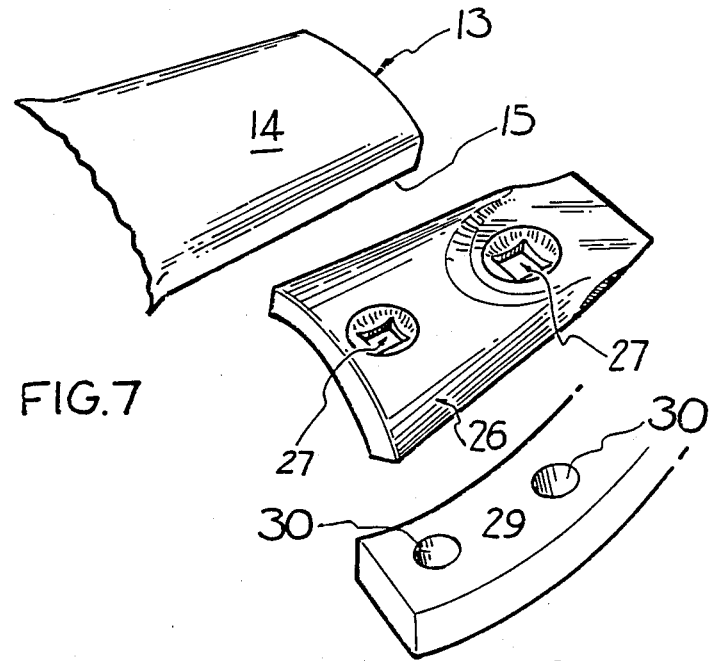
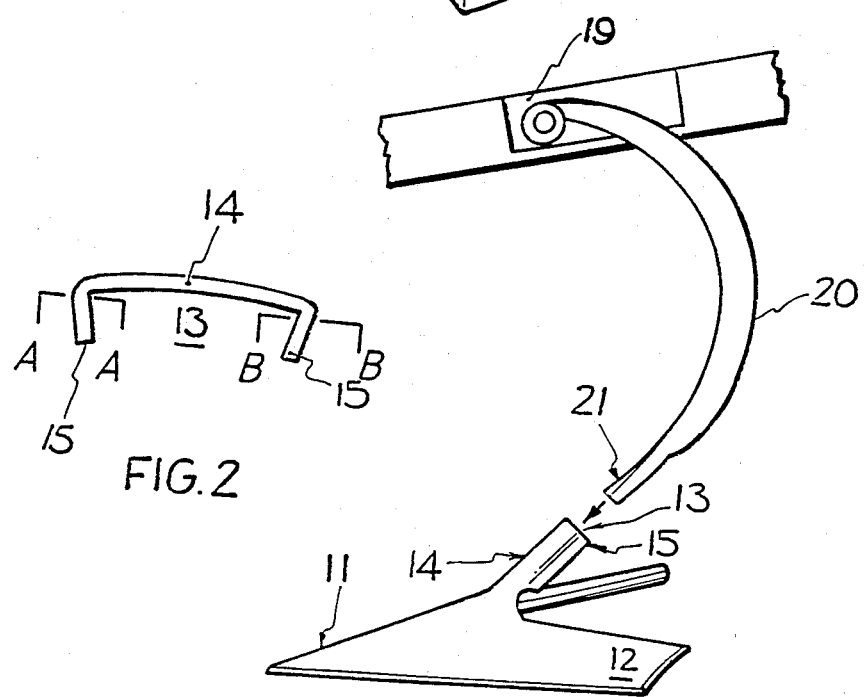

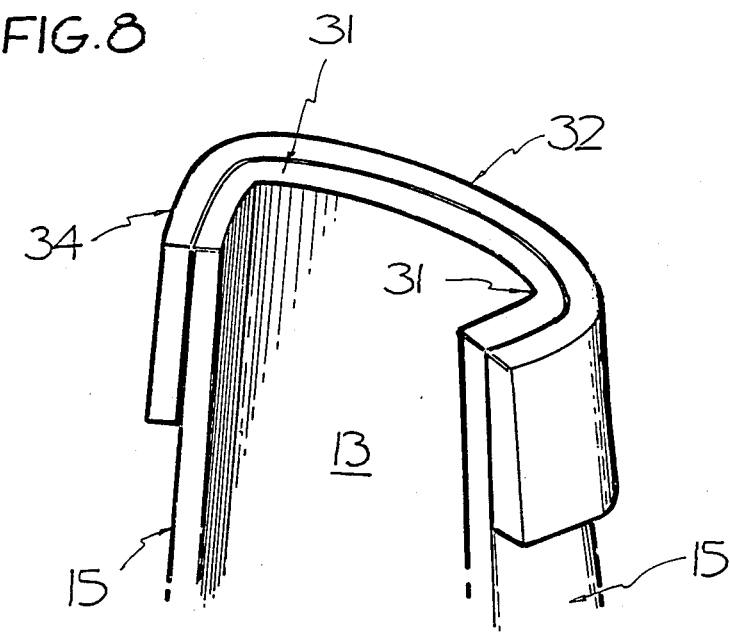
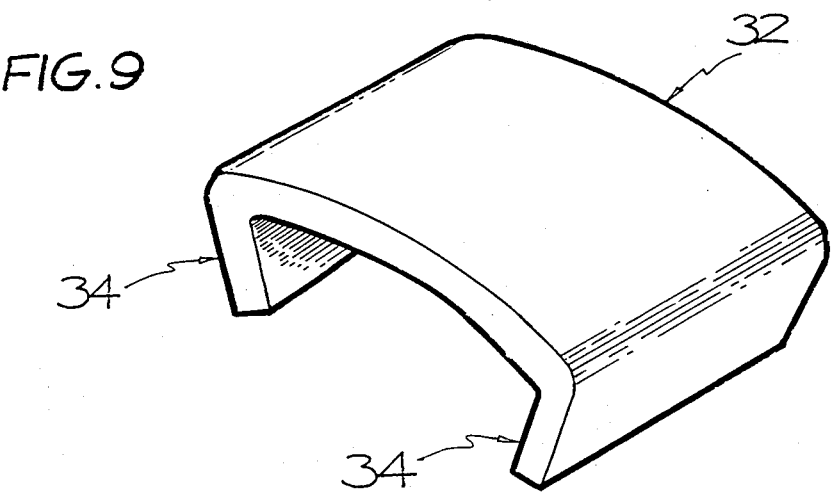

DEEP TILLAGE IMPLEMENT

This is a continuation-in-part of application Ser. No. 036,707, filed Apr. 10, 1987, abandoned.

This invention relates to an agricultural implement useful for Deep Tillage work.

Conventionally tillage of soil is to depths of 8 cm but in well worked soils it is sometimes necessary to break up compacted soils to greater depths. Deep tillage is usually at depths greater than 8 cm, most typically 15 to 20 cm and sometimes 25 to 30 cm.

When working at such depths the forces acting on the implement tend to change and much greater loads are encountered in a downward and rearward direction particularly where the implement point is caught under a rock or root.

The conventional means of fastening earth engaging implements to the tines of agricultural machines is by bolts or by frictional retention as described in Australian Pat. No. 106027 (Marlow). Bolts provide a secure fitting but can be difficult to loosen after the implement has been used for some time. Worn implements need to be replaced and unfastening and refastening bolts is tedious and time consuming. The wedge-on functional fitting proposed by Marlow is quite effective for conventional tillage work. The socket which fits onto the tine foot is tapered from top to bottom and in use is forced further on to the foot of the tine.

If an implement strikes an immovable object in the soil such as a root or a stone the "stump jump" recoil mechanism of the tine is actuated and the tine springs, rearwardly to clear the obstruction.

The forces encountered in deep tillage work are much larger than those in conventional tillage and the spring loading of the tines is 4 to 6 times that for tines used in conventional tillage. Thus if an implement in deep tillage work hits an obstruction the forces applied to the implement before it is removed by the tine recoil mechanism are much greater. The forces in these circumstances particularly where the implement is caught under rock or root tend to act downwardly on the implements and if they are secured by a conventional Marlow type frictional fitting they can be loosened and fall off the tine.

There are four category of forces which the deep tillage sweep can be subjected to.

(a) Horizontal forward impact; for example with a rock. This is usually limited by the stump jump mechanism and is a moderate force tending to drive the sweep on to the tine.

(b) Horizontal rearward impact when the tine recoils. This force can be very high and tends to throw the sweep forward and is only attenuated by the springiness of the machine frame and components.

(c) Vertical downward force as when a sweep gets caught on a root—tends to pull the sweep off the tine. The forces can be very high and unlimited.

(d) Vertical upward force as when the sweep slides over a rock which tends to drive the sweep onto the tine. The force is limited by the weight of the machine and is a moderate force.

With the conventional Marlow friction grip fitting the moderate forces (a) and (d) will tend to tighten the sweeps fitting to the tine while the high forces (b) and (c) will tend to loosen it. Thus in deep tillage work the conventional friction fitting is likely to be loosened during use.

One solution to this problem is to lengthen the socket to increase the frictional area of contact. This is an expensive solution because it requires more material to be used in making the implements.

It is an object of this invention to overcome these problems. To this end the present invention provides an earth engaging implement for deep tillage work comprising an earth engaging portion and an attachment portion having a recess for frictional attachment to a tine of an agricultural machine, said recess increasing in cross sectional area in a direction corresponding to the working orientation of the implement and being shaped to fit over a complementary shaped portion of a tine to provide a wedge-like fitting.

By providing a taper in the reverse direction to that taught by Marlow the implement has been found in testing to provide superior fastening and does not become loosened due to the implement striking obstructions in the soil.

Referring to the four forces (a) to (d) discussed above with the reverse friction fitting of this invention, the moderate force (a) tends to loosen the sweep but the force is limited by the jump mechanism and loosening can be resisted.

Similarly although force (d) tends to loosen the sweep the moderate nature of the force can be resisted.

With the reverse friction fitting of this invention the high forces (b) and (c) tend to tighten the sweep to the tine. Thus there is little likelihood that in use the implement of this invention will be loosened.

The foot of the tine can be shaped to accept the socket portion of the implement or alternatively an adaptor to which the implement is attachable can be bolted to a conventional tine and thus make the implements more versatile in their application.

A further embodiment of this invention is concerned with a problem encountered with implements formed from a thinner metal plate e.g. 6 mm when used in rough ground conditions.

Under such conditions cracks appear in the bent portions of the socket of the attachment portion particularly at the upper ends. Where the socket is formed from inwardly bent flanges the down forces on the upper leading surface of the earth engaging portion is translated with lateral forces which cause failure at the junction of the face and flanges of the socket.

This problem can be overcome by using a thicker metal plate for the attachment portion or by using a clip which encompasses the upper section of the attachment portion. This clip will form a socket to fit over the outer portion of the socket and reinforce it.

A preferred embodiment of this invention will now be described with reference to the drawings in which:

FIG. 2 is an end view of the attachment portion;

FIG. 4 is a schematic view of a tine and sweep array;

FIG. 7 is an exploded view of a sweep adaptor and tine.

FIG. 8 is a view of the reinforcing clip attached to the top of the attachment portion and FIG. 9 is a view of the reinforcing clip.

Figure 1:
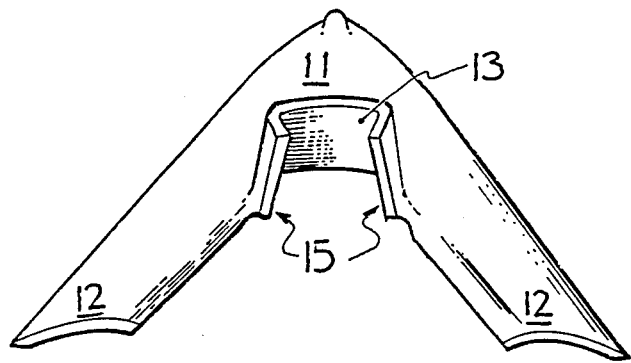
FIG. 1 is a rear perspective view of the sweep according to this invention.
Figure 3:
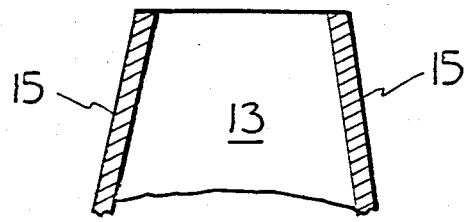
FIG. 3 is a section view of A—A to B—B of FIG. 2.

The sweep comprises an earth engaging portion 11 having two backward swept wings 12 and an upwardly extending attachment portion 13 formed as a socket by the face portion 14 and the flanges 15. The socket 13 has an upwardly directed taper. The sweep is formed integrally. from a triangular metal blank in similar fashion to the forming of conventional sweeps except that the attachment portion 13 is formed to taper in cross section in an upward direction away from the earth engaging portion 11. Preferably the angle of taper of each side of the socket 13 to the centre tine of socket 13 is about 3°. The flanges 15 are preferably inclined about 28° each to the tine normal to the centre of face 14.

A tine 20 having a foot 21 shaped complementarily to the socket 13 and offset to aid attachment can be used. This arrangement is shown in FIG. 4 where the tine is shown attached to a tool bar 19 of an agricultural machine.

Figures 5, 6:
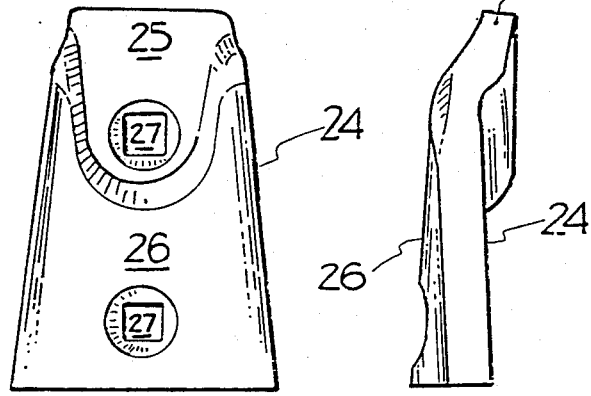
FIG. 5 is a plan view of an adaptor for use in this invention.
FIG. 6 is a side view of the adaptor.

To enable the sweep of this invention to be used with conventional tines an adaptor is provided. This is illustrated (in one form) in FIGS. 5 to 7. The adaptor 24 comprises a tine abutment portion 25 a socket engaging portion 26 having sides which taper upwardly and two bolt holes 27 by which the adaptor is secured to the tine foot. FIG. 7 illustrates the mode of attachment wherein the tine foot 29 is fastened to the adaptor 24 by bolts passing through the aligned holes 27 of the adaptor and 30 of the tine foot. The socket engaging portion 26 is elevated above the tine abutment portion to allow the socket portion 13 of the sweep to be slid down the socket engaging portion which is of complementary tapering external shape corresponding to the internal shape of socket 13.

The angle of taper of the sides of the socket engaging portion are also preferably about 3°. The elevation of the socket engaging portion above the tine abutment portion exposes the upper part of the socket portion 13 of the implement so that it can be easily struck with a hammer.

When implements formed of thinner plate metal are used it is desirable to reinforce the attachment portion 13 with a reinforcing clip 32 shown in FIGS. 8 and 9. The clip comprises a body or face portion 33 and inwardly bent flanges 34 whch form a socket to fit over the face portion 14 and flanges 15 of the attachment portion 13.

The tendency of the flanges 15 to open up and crack at the points 31 in socket portion 13 is retarded by the presence of the clip 32 which is aligned to sit flush with the top of socket 13.

To assemble the sweep to a conventional tine the adaptor is bolted onto the tine and the sweep is then slid onto the adaptor by placing the base of the socket 13 adjacent the tine abutment portion 25 and sliding the tine onto the socket engagement portion 26. A tight fit is obtained by hammering the top of the socket portion 13.

It is preferred to select an adaptor which will result in an inclination to the horizontal of 55° for the socket portion of the fitted sweep. This is the optimum angle which allows for effective tillage work with no loss of frictional grip by the socket on the adaptor. This angle also enables easy removal of the sweep by hammering on the point of the earth engaging portion 11 of the sweep.

An additional advantage of the implement construction of this invention is the improved soil flow about the base of the attachment portion 13 because of the narrower cross section created by the reverse taper.

We claim:

1. An earth engaging implement for deep tillage work comprising an earth engaging portion and an attachment portion having a recess defined by flange portions extending upwardly from said earth engaging portion configured to embrace and wedgingly frictional attach to a tine of an agricultural machine, said recess decreasing in cross sectional area in a direction away from the earth engaging portion and being shaped to fit over and closely conform to a complementary shaped portion of a tine to provide a wedge-like fitting and be solely retained thereby.

2. An earth engaging implement as claimed in claim 1 in which an adaptor complementary in shape to the recess of said attachment portion is provided for attachment to a tine.

3. An earth engaging implement as claimed in claim 1 wherein the implement is made of plate metal of thickness above 7 mm.

4. An earth engaging implement as claimed in claim 1 wherein the implement and socket is formed of plate matal of 6 mm or less thickness and the upper portion of the attachment portion being reinforced by an externally fitted clip encompassing the recess forming portion of the attachment portion.

* * * * *